United States Patent

Lerner

[15] 3,707,233
[45] Dec. 26, 1972

[54] FILTER TANK AND MOUNTING ADAPTOR FOR MULTIPORT VALVES

[72] Inventor: Marc Lerner, Swan Lake, N.Y. 12783

[22] Filed: Oct. 13, 1970

[21] Appl. No.: 80,327

[52] U.S. Cl. .................. 210/278, 210/281, 210/288
[51] Int. Cl. ............................................. B01d 23/20
[58] Field of Search....... 210/278, 279, 288, 436, 281

[56] References Cited

UNITED STATES PATENTS

| 3,317,044 | 5/1967 | Marks | 210/279 X |
| 2,973,097 | 2/1961 | Snider | 210/288 X |
| 3,347,785 | 10/1967 | Staats | 210/278 X |
| 3,381,823 | 5/1968 | Nash | 210/288 X |
| 2,418,777 | 4/1947 | Le Clair | 210/436 X |

*Primary Examiner*—Samih N. Zaharna
*Attorney*—Lawrence S. Lawrence

[57] ABSTRACT

A mounting adaptor for multiport multiposition valves adapted to be removably attached to an opening in a filter tank is provided. The adaptor has a peripheral flange which sealably engages a corresponding flange on the filter tank and is secured in place by a v-band coupling. Two fluid connecting ports for attachment to the multiport valve are provided to supply fluid to and discharge fluid from the filter depending on the valve position. The mounting adaptor also includes a fluid diffuser adapted to be disposed within the filter tank to uniformly distribute the influent fluid across the filter.

7 Claims, 2 Drawing Figures

PATENTED DEC 26 1972  3,707,233

FILTER TANK AND MOUNTING ADAPTOR FOR MULTIPORT VALVES

Many filtration units, particularly those employed in swimming pool circulation systems, comprise a tank type filter containing a bed of various grades of filtration sand or diatomaceous earth, and a multiport multiposition valve in fluid communication with the filter tank having selectable filter and backwash flow positions. In the filter position influent fluid is directed to the top of the filter bed. As the fluid passes downwardly through the bed contaminants entrained therein are removed. In the backwash position influent fluid is directed in the reverse direction to the bottom of the filter bed to clean the bed by carrying away contaminants that had previously been entrapped therein.

To accomplish this filter tanks have been provided with fluid line connections at the top and bottom, and the appropriate piping to attach the fluid line connections to the multiport valve. Such piping arrangements are cumbersome and costly to install and often difficult to maintain due to the many potential leakage paths they possess. In addition, servicing of the multiport valve and/or the filter often requires the disconnection of the piping. This can also be a costly and difficult task.

Filter tanks are usually provided with an access opening to initially fill the tank with the filter material and to service it thereafter, and a removable cover enclosing the opening to prevent leakage during use. It has been suggested in U.S. Pat. No. 3,316,937 to Friedman et al. that a slide type multiport valve can be adapted to mount directly on the filter tank at the access opening, thus eliminating the need for fluid line connections on the filter tank and the piping between the tank and the valve.

Unfortunately, however the Friedman et al. device has many deficiencies. The slide type valve comprising a cylindrical housing having a flange adapted to mate with the periphery of the access opening in the tank and a cylindrical slide rotatably disposed within the housing is the basis for the Friedman et al. patent and appears to be the only type of valve that can be installed in the manner described. But valves of this type are often subject to cross-leakage between unselected ports or internal chambers and are therefore not very efficient. In critical systems where leakage cannot be tolerated such valves cannot be employed. Furthermore, Friedman et al. do not disclose means for uniformly distributing the influent fluid across the filter bed. As a result the fluid will take the path of least resistance and will flow into the filter in a relatively narrow stream, effectively using only a small portion of the filter material. This causes premature plugging and requires more frequent backwashing and other servicing.

In accordance with the present invention a mounting adaptor for multiport valves having selectable filter and backwash flow positions adapted to be removably attached to an opening in a filter tank is provided. The mounting adaptor can be designed for use with any type of multiport valve and is therefore far more versatile than prior filter mounted multiport valves. In addition, the mounting adaptor includes a fluid diffuser to uniformly distribute influent fluid across the filter bed to effectively utilize all of the filter material.

The mounting adaptor of the invention comprises a plate having a peripheral flange to sealably engage a corresponding flange at the opening to the filter tank, a first fluid connecting port for connection to a corresponding port in the multiport valve to receive influent fluid to be filtered in the filter position of the valve and to discharge backwash waste effluent in the backwash position of the valve, a second fluid connecting port for connection to a second corresponding port in the multiport valve to discharge filtered effluent in the filter position of the valve and to receive influent fluid to backwash the filter in the backwash position of the valve; and a fluid diffuser attached to the plate and adapted to be disposed within the filter tank having at least one flow chamber in communication with the first fluid connecting port and a plurality of flow openings in communication with the chamber to uniformly distribute influent fluid to be filtered across the filter bed and to uniformly receive backwash waste effluent from the filter bed.

The plate can have any desired geometric shape, such as square, rectangular or circular. In most cases however a circular shape is preferred since it is most easily formed and most easily adapted to be installed in a leakproof manner.

The peripheral flange on the plate and the corresponding flange on the tank can be of any type commonly used to sealably engage two mating parts in a pressure vessel. Gaskets can be interposed between the flanges to ensure a leakproof connection. Suitable flanges include those that are bolted together, those that threadedly engage each other, and those that are secured by a band clamp or coupling. The latter type and more particularly flanges adapted to be secured by a v-band coupling are preferred since they are the least costly to produce and can be rapidly and easily installed or disassembled.

The fluid connecting ports can be disposed on the plate in any position adapted to accommodate the ports in the multiport valve, and to mount and hold the valve in any desired position with respect to the adaptor plate. The ports can be threaded, flanged or simply adapted to be bonded to the corresponding ports in the valve. In the latter case the valve and the adaptor form a unitary structure. In all cases the connecting means employed firmly secures the valve in place.

Fluid diffusers are well known in the tank filter art, and any suitable type known to those skilled in the art can be employed in the present invention. The diffuser can be removably or permanently attached to the plate by employing any of the connecting means described above. It can also be formed as an integral part of the plate by molding the plate and diffuser as a unitary structure.

To discharge filtered fluid and supply backwash influent fluid to the bottom of the filter bed, a standpipe is centrally disposed within the filter tank. Accordingly, the diffuser has a corresponding fluid passage formed therein in communication with the second fluid connecting port in the plate and adapted to sealably engage the end of the standpipe to carry flow to and from the bottom of the filter bed, depending on the valve position.

The adaptor plate and the diffuser can be constructed from any material that has the tensile strength to withstand the operating pressures of the filter and valve. Plastic materials suitable for injection or compression molding are preferred for several reasons. By utilizing plastic materials, the cost of molding the adaptor is kept to a minimum, inasmuch as the material itself is inexpensive, and usually requires little labor time for casting or molding. In addition, many plastic materials are resistant to deterioration by fluids, such as chlorinated water, which is a necessity in a swimming pool water circulation system, for example. Many plastic materials are also lightweight compared to metal, and thus permit the adaptor to be assembled and installed with relative ease. Moreover, when the multiport valve is threadably attached to the adaptor, the plastic material can usually be deformed to perform the function of a seal to prevent external leakage, thus requiring no additional sealing means such as gaskets, o-rings or tape.

Plastics such as ABS polymer, Celcon (polycarbonate resin), Cellon (cellulose acetate), Delrin (polyoxymethylene), nylon and Teflon (polytetrafluoroethylene) are particularly well suited for the formation of the adaptor. Transparent or translucent plastic materials, such as polyethylene, polypropylene, polyvinylchloride, and Lexan (polycarbonate resin) can also be employed. In systems where it is desirable to observe the clarity of the fluid at any given time, the use of a transparent adaptor plate is advantageous.

Metallic materials can also be utilized for the construction of the adaptor where additional strength is required, although they are less desirable than plastic. Suitable corrosion resistant metals include aluminum, bronze, stainless steel, brass, zinc, nickel, chromium cadmium-plated and zinc plated iron, and ceramic coated metals.

The invention is further described with reference to the drawings in which.

Figure 1:
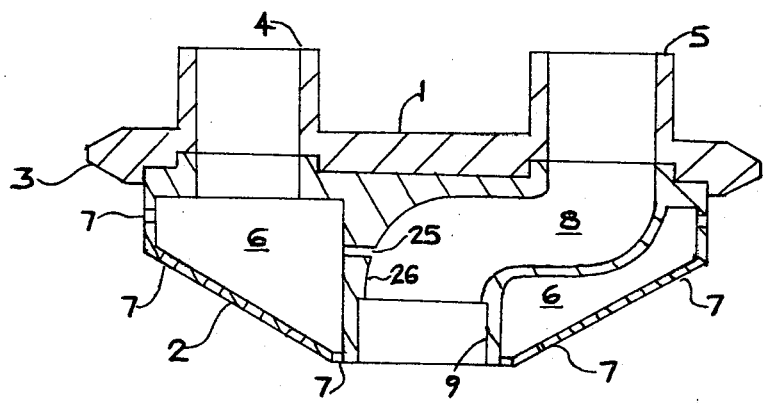
FIG. 1 is a cross-sectional view of the mounting adaptor of the invention.
Figure 2:
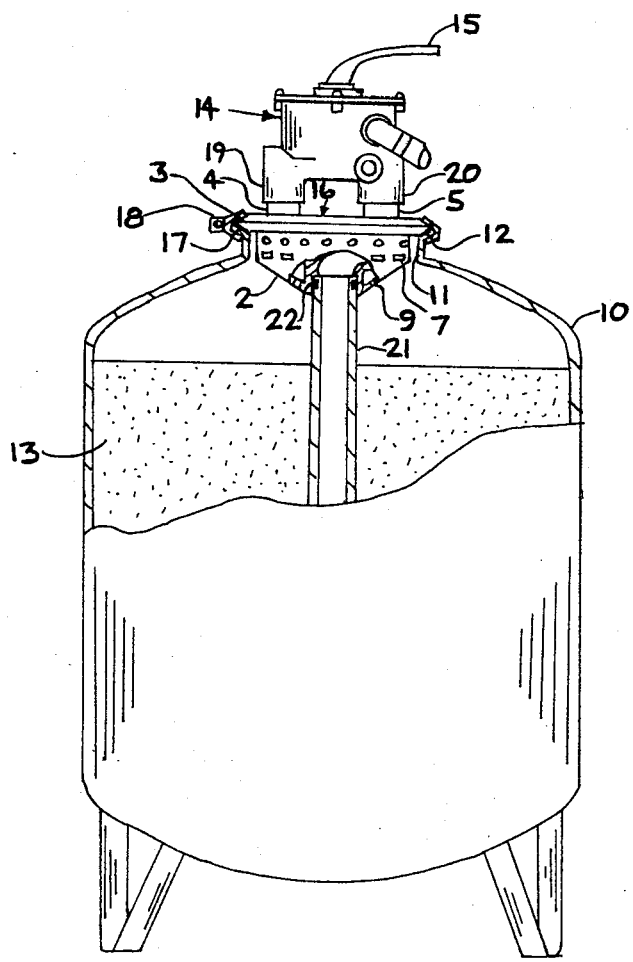
FIG. 2 is a partial cross-sectional view of a filter and valve assembly for fluid circulation systems including the mounting adaptor of the invention.

The mounting adaptor for multiport valves shown in FIG. 1 comprises a circular adaptor plate 1 and a fluid diffuser 2 bonded to the plate. The plate 1 has a peripheral flange 3 adapted to engage a corresponding flange formed at the opening to a filter tank, as shown in FIG. 2 and described hereinafter. The plate 1 also has a pair of upstanding cylindrical fluid connecting ports 4 and 5 adapted to engage a pair of corresponding ports in a multiport valve to fixedly secure the valve in place and provide fluid communication between the valve and the filter tank.

The fluid diffuser 2 is frusto-conical in shape and is adapted to be disposed within the filter tank. The diffuser has a flow chamber 6 in communication with fluid connecting port 4 and a plurality of flow openings 7 in communication with chamber 6 to uniformly distribute influent fluid to be filtered across a filter bed within the tank. A flow passage 8 formed within the diffuser 2 communicates valve connecting port 5 and a central port 9. Port 9 is adapted to engage a central standpipe in the filter tank to facilitate fluid communication between the multiport valve and the bottom of the filter bed. A bleed hole 25 is disposed in a wall 26 of the diffuser communicating the flow chamber 6 and flow passage 8. The purpose of the bleed hole 25 is to discharge air that would ordinarily be trapped in the upper portion of a filter tank. When the mounting adaptor is installed as shown in FIG. 2 the flow passage 8 communicates with the bottom of the filter bed by means of the central standpipe. Since the influent fluid in chamber 6 has a higher pressure than the effluent fluid in flow passage 8, due to a pressure loss across the filter bed, the differential pressure forces the air through hole 25. If the hole as a diameter of approximately one-eighth inch or less the amount of cross fluid leakage under normal flow conditions is negligible.

The filter and valve assembly shown in FIG. 2 comprises a substantially cylindrical filter tank 10 having a single circular access opening 11 with a peripheral flange 12. A bed of filtration sand 13 is disposed within the tank 10 to remove contaminants from influent fluid. A manually operable multiport valve 14 is disposed at the exterior of the tank. The valve has an internal rotor (not shown) which is rotatable by means of handle 15 between filter and backwash positions to selectively interconnect the top and bottom of the filter bed with the fluid circulation system.

The multiport valve 14 is fixedly secured in place by means of mounting adaptor 16 which is essentially the same as the adaptor shown in FIG. 1. In this embodiment the plate and the diffuser are formed as a unitary structure. Connecting port 4 on the adaptor is bonded within corresponding port 19 on the valve and connecting port 5 is likewise bonded within corresponding port 20 on the valve. Peripheral flange 3 on the adaptor 16 mates with flange 12 on the filter tank and is fixedly secured by means of v-band coupling 18. A gasket 17 is interposed between the two flanges to ensure a leak-proof connection. The central port 9 formed in the diffuser 2 slidably engages the end of central standpipe 21 disposed within tank 10 and extending to the bottom of filter bed 13. An O-ring 22 is disposed near the end of standpipe 21 to sealably engage port 9 to prevent by-pass leakage.

In operation the multiport valve 14 is initially set in the filter position, wherein fluid that enters the multiport valve is conducted via port 19 to adaptor connecting port 4. The influent fluid then passes through chamber 6 in the diffuser 2 and is uniformly distributed across the top of filter bed 13 by means of flow openings 7. The fluid proceeds through bed 13 wherein contaminants entrained in the fluid are removed. The filtered effluent is discharged from the filter through standpipe 21 via diffuser passage 8 and connecting port 5. The filtered fluid is received by the multiport valve through port 20 and then passes into the circulation system.

When the filter bed becomes plugged, the flow in the filter is reversed by moving the valve by means of handle 15 to the backwash position. Fluid from the system is then directed by the valve to the bottom of the filter bed 13 via port 20, connecting port 5, fluid passage 8 and standpipe 21. The reverse flow of fluid through the filter bed removes the contaminants entrapped therein, thus revitalizing the filter. The backwash waste effluent is uniformly received from the top of the filter bed by the diffuser 2 which conducts the fluid to connecting port 4 via chamber 6. The effluent flow then enters the multiport valve via port 19 for discharge to a waste line. When the filter bed is sufficiently cleaned, the valve is again moved to the filter position to recommence the filtration process.

To service the filter tank or bed or the multiport valve the v-band coupling 18 is loosened and the entire multiport valve-mounting adaptor assembly can be easily removed. The only piping connections that need be disassembled are those connecting the valve and the fluid circulating system. The connection between the valve and the mounting adaptor need not be disturbed.

The mounting adaptors shown in the drawings are for illustrative purposes only. Other embodiments within the scope of the invention will be apparent to those skilled in the art.

I claim:

1. A mounting adaptor for multiport valves having selectable filter and backwash flow positions for use in filtration systems, adapted to be removably attached to an opening in the tank of a bed type filter to permit access thereto, comprising a plate having a peripheral flange to sealably engage a corresponding flange at the opening to the filter tank, a first fluid connecting port adapted for connection to the multiport valve to receive influent fluid to be filtered in the filter position of the valve and to discharge backwash waste effluent in the backwash position of the valve, a second fluid connecting port adapted for connection to the multiport valve to discharge filtered effluent in the filter position of the valve and to receive influent fluid to backwash the filter in the backwash position of the valve; and an inverted frustoconically shaped fluid diffuser integrally attached at its larger diameter end to the plate to form a unitary structure therewith and adapted to be disposed within the filter tank at least partially below the access opening, said diffuser having an annular flow chamber in communication with the first fluid connecting port, a plurality of flow openings formed in the conical wall thereof in communication with the chamber to uniformly distribute influent fluid to be filtered across the top of the filter bed, a fluid passage formed therein in communication with the second fluid connecting port of the plate, an air bleed hole communicating the fluid passage and the annular chamber to discharge air trapped above the filter bed in said tank, and a further connecting port in communication with said fluid passage located at its smaller diameter end to be spaced below the tank access opening and adapted to sealably and removably engage a central standpipe in the filter tank to receive filtered fluid from and to supply backwash influent to the bottom of the filter bed, said further connecting port permitting removal of the adaptor from the standpipe to open and provide access to the tank interior without distributing the filter bed.

2. A multiport valve mounting adaptor in accordance with claim 1, in which the peripheral flange is adapted to be secured to the corresponding flange on the filter tank by a v-band coupling.

3. A multiport valve mounting adaptor in accordance with claim 1, molded from plastic material.

4. A filter and valve assembly for fluid circulation systems comprising, in combination, a filter tank having an access opening with a peripheral flange; a bed of filter material disposed within the filter tank to remove contaminants from the influent fluid; a multiport valve disposed at the exterior of the tank having selectable filter and backwash flow positions to selectively interconnect the filter with the fluid circulation system; a standpipe centrally disposed within the filter tank and terminating at a point below the access opening to receive water from and supply water to the bottom of the filter bed; and a mounting adaptor for the multiport valve removably attached to and enclosing the opening in the tank to permit access thereto, comprising a plate having a peripheral flange which sealably engages the flange on the tank, a first fluid connecting port attached to the multiport valve to receive influent fluid to be filtered in the filter position of the valve and to discharge backwash waste effluent in the backwash position of the valve, a second fluid connecting port attached to the multiport valve to discharge filtered effluent in the filter position of the valve and to receive influent fluid to backwash the filter in the backwash position of the valve, and an inverted frustoconically shaped fluid diffuser integrally attached at its larger diameter end to the plate to form a unitary structure therewith and disposed within the filter tank at least partially below the access opening and above the filter bed, said diffuser having an annular flow chamber in communication with the first fluid connecting port, a plurality of flow openings formed in the conical wall thereof in communication with the chamber to uniformly distribute influent fluid to be filtered across the filter bed, a central flow passage formed therein in communication with the second fluid connecting port of the plate, an air bleed hole communicating the central flow passage and the annular chamber to discharge air trapped above the filter bed upon start up, and a further connecting port located at its smaller diameter end in communication with the central flow passage at a point spaced below the tank access opening sealably and removably engaging the end of the standpipe to direct fluid between the multiport valve and the bottom of the filter bed, said further connecting port permitting removal of the adaptor from the standpipe to open and provide access to the tank interior without disturbing the filter bed.

5. A filter and valve assembly in accordance with claim 4, in which the valve mounting adaptor is secured in place on the filter tank by a v-band coupling.

6. A filter and valve assembly in accordance with claim 4, in which the connecting ports on the mounting adaptor plate are bonded to the multiport valve.

7. A filter and valve assembly in accordance with claim 4, in which the mounting adaptor and multiport valve are formed of plastic material.

* * * * *